US012585941B2

(12) United States Patent
Anthony et al.

(10) Patent No.: US 12,585,941 B2
(45) Date of Patent: Mar. 24, 2026

(54) TRAINING A POLICY NEURAL NETWORK FOR CONTROLLING AN AGENT USING BEST RESPONSE POLICY ITERATION

(71) Applicant: GDM Holding LLC, Mountain View, CA (US)

(72) Inventors: Thomas William Anthony, London (GB); Thomas Edward Eccles, London (GB); Andrea Tacchetti, London (GB); János Kramár, London (GB); Ian Michael Gemp, London (GB); Thomas Chalmers Hudson, London (GB); Nicolas Pierre Mickaël Porcel, London (GB); Marc Lanctot, London (GB); Julien Perolat, Saint Etienne (FR); Richard Everett, London (GB); Thore Kurt Hartwig Graepel, Cambridge (GB); Yoram Bachrach, London (GB)

(73) Assignee: GDM Holding LLC, Mountain View, CA (US)

( * ) Notice: Subject to any disclaimer, the term of this patent is extended or adjusted under 35 U.S.C. 154(b) by 1029 days.

(21) Appl. No.: 17/570,870

(22) Filed: Jan. 7, 2022

(65) Prior Publication Data

US 2022/0261635 A1     Aug. 18, 2022

Related U.S. Application Data

(60) Provisional application No. 63/149,032, filed on Feb. 12, 2021.

(51) Int. Cl.
*G06N 3/08* (2023.01)
*G06N 3/045* (2023.01)
(52) U.S. Cl.
CPC ............... *G06N 3/08* (2013.01); *G06N 3/045* (2023.01)

(58) Field of Classification Search
CPC ...................................................... G06N 3/08
See application file for complete search history.

(56) References Cited

U.S. PATENT DOCUMENTS 11,580,378 B2 * 2/2023 Harmer .................. G06N 3/084

FOREIGN PATENT DOCUMENTS

| CN | 113421345 A | * | 9/2021 | ............. G06N 3/006 |
| CN | 113570040 B | * | 9/2024 | ........... G06F 18/214 |

OTHER PUBLICATIONS

Rajeswaran, Aravind, et al. "Epopt: Learning robust neural network policies using model ensembles." arXiv preprint arXiv: 1610.01283 (2016). (Year: 2016).*

(Continued)

*Primary Examiner* — Miranda M Huang

(74) *Attorney, Agent, or Firm* — Fish & Richardson P.C.

(57) ABSTRACT

Methods, systems and apparatus, including computer programs encoded on computer storage media, for training a policy neural network by repeatedly updating the policy neural network at each of a plurality of training iterations. One of the methods includes generating training data for the training iteration by controlling the agent in accordance with an improved policy that selects actions in response to input state representations. A best response computation is performed using (i) a candidate policy generated from respective policy neural networks as of one or more preceding iterations and (ii) a candidate value neural network. The candidate value neural network is configured to generate a value output that is an estimate of a value of the environment being in the state characterized by a state representation to complete a particular task. The policy neural network is updated by training the policy neural network on the training data.

20 Claims, 3 Drawing Sheets

(56)　　　　　References Cited

OTHER PUBLICATIONS

Agmon et al., "Multi-robot perimeter patrol in adversarial settings," 2008 IEEE International Conference on Robotics and Automation, May 2008, pp. 2339-2345.

Alchian et al., "Activity Analysis of Production and Allocation," Cowles Commission for Research in Economics, 1951, 13(1):374-376.

Anthony et al., "Thinking fast and slow with deep learning and tree search." Advances in Neural Information Processing Systems 30, 2017, 11 pages.

Arad et al., "Multi-dimensional iterative reasoning in action: The case of the Colonel Blotto game," Journal of Economic Behavior & Organization, Nov. 2012, 84(2):571-585.

Axelrod et al., "The evolution of cooperation," Science, Mar. 1981, 211(4489): 1390-1396.

Baarslag et al., "The first automated negotiating agents competition (ANAC 2010)," New Trends in Agent-Based Complex Automated Negotiations, Nov. 2011, pp. 113-135.

Baker et al., "Emergent tool use from multi-agent autocurricula," CoRR, Sep. 2019, arXiv:1909.07528, 28 pages.

Balduzzi et al., "Open-ended learning in symmetric zero-sum games," Proceedings of the 36th International Conference on Machine Learning, 2019, Jun. 2019, 97:434-443.

Balduzzi et al., "Re-evaluating evaluation," Advances in Neural Information Processing Systems, 2018, pp. 3268-3279.

Balduzzi et al., "Smooth markets: A basic mechanism for organizing gradient-based learners," CoRR, Jan. 2020, arXiv:2001.04678, 18 pages.

Bansal et al., "Emergent complexity via multi-agent competition," CoRR, Oct. 2017, arXiv:1710.03748, 12 pages.

Bard et al., "The Hanabi challenge: A new frontier for AI research," Artificial Intelligence, Mar. 2020, 280:103216.

Battaglia et al., "Relational inductive biases, deep learning, and graph networks," CoRR, Jun. 2018, arXiv:1806.01261, 40 pages.

Berliner et al., "Backgammon computer program beats world champion," Artificial Intelligence, Sep. 1980, 14(2):205-220.

Berner et al., "Dota 2 with large scale deep reinforcement learning," CoRR, Dec. 2019, arxiv.org/abs/1912.06680, 66 pages.

Borel, "The game theory of play and integral equations with skew symmetric kernels," Econometrica, Jan. 1953, 21:97-100.

Brown et al., "Superhuman AI for heads-up no-limit poker: Libratus beats top professionals." Science, Dec. 2017, 359(6374):418-424.

Brown et al., "Superbuman AI for multiplayer poker," Science, Jul. 2019, 365(6456):885-890.

Campbell et al., "Deep Blue," Artificial Intelligence, Jan. 2002, 134(1-2):57-83.

Carroll et al., "On the utility of learning about humans for human-AI coordination," Advances in Neural Information Processing Systems, 2019, 12 pages.

Celli et al., "Learning to correlate in multi-player general-sum sequential games, " Advances in Neural Information Processing Systems, 2019, 11 pages.

Chen et al., "3-NASH is PPAD-Complete," Electronic Colloquium on Computational Complexity, 2005, 134:12 pages.

Crandall et al., "Cooperating with machines," Nature Communications, Jan. 2018, 9(1):1-12.

Daide.org.uk [online], "DAIDE Diplomacy Artificial Intelligence Development Environment," Apr. 2, 2006, retrieved on May 21, 2012, retrieved from URL<http://www.daide.org.uk/>, 1 pages.

Daskalakis et al., "A counter-example to Karlin's strong conjecture for fictitious play;" 2014 IEEE 55th Annual Symposium on Foundations of Computer Science, Oct. 2014, 10 pages.

Daskalakis et al., "Three-player games are hard," Electronic Colloquium on Computational Complexity, Nov. 2005, 10 pages.

De Jonge et al., "D-Brane: a Diplomacy playing agent for automated negotiations research," Applied Intelligence, Feb. 2017, 47(1):158-177.

Deepmind.com [Online] "Alphastar Mastering the real-time strategy game Starcraft II," Jan. 24, 2019, retrieved on Aug. 11, 2023, retrieved from URL<https://www.deepmind.com/blog/alphastar-mastering-the-real-time-strategy-game-starcraft-ii>, 15 pages.

Eccles et al., "The imitation game: Learned reciprocity in markov games," Proceedings of the 18th International Conference on Autonomous Agents and MultiAgent Systems, May 2019, pp. 1934-1936.

Espeholt et al., "IMPALA: Scalable distributed deep-RL with importance weighted actor-learner architectures," Proceedings of the 35th International Conference on Machine Learning, 2018, 80:1407-1416.

Fabregues et al., "A testbed for multiagent systems Technical Report IIIA-TR-2009-09." IIIA: Institut d'Investigaci en Intelligncia Artificial, Oct. 2009, 18 pages.

Farina et al., "Coarse correlation in extensiveform games," Proceedings of the AAAI Conference on Artificial Intelligence, Apr. 2020, 34(2):1934-1941.

Ferreira et al., "DipBlue: A Diplomacy agent with strategic and trust reasoning," ICAART 2015-7th International Conference on Agents and Artificial Intelligence, 2015, pp. 54-65.

Ferrucci, "Introduction to This is Watson," IBM Journal of Research and Development, May 2012, 56(3.4):15 pages.

Findler, "Studies in machine cognition using the game of Poker," Communications of the ACM, Apr. 1977, 20(4):230-245.

Foerster et al., "Bayesian action decoder for deep multi-agent reinforcement learning," Proceedings of the 36th International Conference on Machine Learning, 2019, 97:1942-195.

Foerster et al., "Learning with opponent-learning awareness," CoRR, Sep. 2017, arxiv.org/abs/1709.04326, 14 pages.

Fudenberg et al., "Learning and equilibrium," Annual Review of Economics, Sep. 2009, 1:385-419.

Fudenberg et al., "Learning mixed equilibria," Games and Economic Behavior, Jul. 1993, 5(3):320-367.

Genesereth et al., "General game playing: Overview of the AAAI competition," AI magazine, Jun. 2005, 26(2):62-62.

Genugten, "A weakened form of fictitious play in two-person zero-sum games," International Game Theory Review, 2000, 2(04):307-328.

Gibson, "Regret minimization in non-zero-sum games with applications to building champion multiplayer computer poker agents," CoRR, Apr. 2013, arXiv:1305.0034, 48 pages.

Gordon et al., "No-regret learning in convex games," Proceedings of the 25th international conference on Machine learning, Jul. 2008, pp. 360-367.

Greenblatt et al., "The Greenblatt Chess Program," Proceedings of the fall joint computer conference, Nov. 1967, pp. 801-810.

Guss et al., "The MineRL competition on sample efficient reinforcement learning using human priors," CoRR, Apr. 2019, arXiv:1904. 10079, 28 pages.

Hall et al., "Thoughts on programming a diplomat," Heuristic Programming in Artificial Intelligence. Nov. 1995, 3(9):123-145.

Harris, "On the rate of convergence of continuous-time fictitious play," Games and Economic Behavior, Feb. 1998, 22(2):238-259.

Heinrich et al., "Deep reinforcement learning from self-play in imperfectinformation games." CoRR, Mar. 2016, arXiv:1603. 01121, 10 pages.

Heinrich et al., "Fictitious self-play in extensive-form games," Proceedings of the 32nd International Conference on Machine Learning, 2015, pp. 37:805-813.

Herbrich et al., "TrueskillTM; a Bayesian skill rating system," Advances in neural information processing systems 19, 2006, pp. 569-576.

Hochreiter et al., "Long short-term memory," Neural computation, Nov. 1997, 9(8):1735-1780.

Hofbaner et al., "Evolutionary game dynamics," Bulletin of the American Mathematical Society, 2003, 40(4):479-519.

Hofbauer et al., "On the global convergence of stochastic fictitious play," Econometrica, Nov. 2002, 70(6):2265-2294.

Hu et al., "Simplified action decoder for deep multi-agent reinforcement learning," CORR, Dec. 2019, arxiv.org/abs/1912.02288, 14 pages.

Hughes et al., "Learning to resolve alliance dilemmas in many-player zero-sum games," CoRR, Feb. 2020, arXiv:2003.00799, 10 pages.

(56) References Cited

OTHER PUBLICATIONS

Jaderberg et al., "Human-level performance in 3D multiplayer games with population-based reinforcement learning.," Science, May 2019, 364(6443):859-865.

Johansson et al., "Tactical coordination in no-press diplomacy;" Proceedings of the Fourth International Joint Conference on Autonomous Agents and Multiagent Systems, Jul. 2005, pp. 423-430.

Jonge et al., "The challenge of negotiation in the game of Diplomacy," International Conference on Agreement Technologies, Apr. 2019, pp. 100-114.

Jordan, "Three problems in learning mixed-strategy Nash equilibria," Games and Economic Behavior, Jul. 1993, 5(3):368-386.

Kempka et al., "VizDoom: A Doom-based AI research platform for visual reinforcement learning;" Conference on Computational Intelligence and Games, Sep. 2016, pp. 1-8.

Kipf et al., "Semi-supervised classification with graph convolutional networks," CoRR, Sep. 2016, arXiv:1609.02907, 14 pages.

Knuth et al., "An analysis of Alpha-Beta pruning, " Artificial Intelligence, 1975, 6(4):293-326.

Kohli et al., "Colonel Blotto on Facebook: The effect of social relations on strategic interaction." WebSci'12: Proceedings of the 4th Annual ACM Web Science Conference, Jun. 2012, pp. 141-150.

Koutník et al., "Evolving large-scale neural networks for vision-based reinforcement learning," Proceedings of the 15th Annual Conference on Genetic and Evolutionary Computation, Jul. 2013, pp. 1061-1068.

Kraus et al., "Designing and building a negotiating automated agent," Computational Intelligence, Feb. 1995, 11(1):132-171.

Kraus et al., "Diplomat, an agent in a multi agent environment; An overview," IEEE International Performance Computing and Communications Conference, 1988, pp. 434-438.

Kraus et al., "Negotiation in a non-cooperative environment." Journal of Experimental & Theoretical Artificial Intelligence, 1991, 3(4):255-281.

Kraus, "An automated Diplomacy player," Heuristic Programming in Artificial Intelligence; The 1st Computer Olympiad, 1989, pp. 134-153.

Lanctot et al., "A unified game-theoretic approach to multiagent reinforcement learning." Advances in Neural Information Processing Systems 30, 2017, pp. 4190-4203.

Lanctot et al., "OpenSpiel: A framework for reinforcement learning in games," CoRR, Aug. 26, 2019, arxiv.org/abs/1908.09453, 27 pages.

Leibo et al., "Multiagent reinforcement learning in sequential social dilemmas," CoRR, Feb. 10, 2017, arxiv.org/abs/1702.03037, 10 pages.

Lerer et al., "Improving policies via search in cooperative partially observable games," CoRR, Dec. 5, 2019, arXiv:1912.02318, 15 pages.

Lerer et al., "Maintaining cooperation in complex social dilemmas using deep reinforcement learning." CoRR, July 4. 2017, arXiv:1707.01068, 15 pages.

Leslie et al., "Generalised weakened fictitious play," Games and Economic Behavior, Aug. 200656(2):285-298.

Lisy et al., "Equilibrium approximation quality of current no-limit Poker bots," CoRR, Dec. 22, 2016, arxiv.org/abs/1612.07547, 6 pages.

Liu et al., "Emergent coordination through competition," CoRR, Feb. 19, 2019, arxiv.org/abs/1902.07151, 19 pages.

Lockhart et al., "Computing approximate equilibria in sequential adversarial games by exploitability descent," CoRR, Mar. 13, 2019, arXiv:1903.05614, 11 pages.

Lowe et al., "Multi-agent actor-critic for mixed cooperative-competitive environments," Advances in Neural Information Processing Systems, 2017, pp. 6379-6390.

McKelvey et al., "Quantal response equilibria for normal form games," Games and Economic Behavior, Jul. 1995, 10(1):6-38.

Mnih et al., "Asynchronous methods for deep reinforcement learning," Proceedings of The 33rd International Conference on Machine Learning, 2016, 48:1928-1937.

Mnih et al., "Playing Atari with deep reinforcement learning," CoRR, Dec. 19, 2013, arXiv:1312.5602, 9 pages.

Moravcík et al., "Deepstack: Expert-level artificial intelligence in heads-up no-limit Poker," Science, Mar. 2, 2017, 356(6337):508-513.

Moulin et al., "Strategically zero-sum games: The class of games whose completely mixed equilibria cannot be improved upon," International Journal of Game Theory, Sep. 1978, 7(3-4):201-221.

Nash et al., "Equilibrium points in n-person games," Proceedings of the National Academy of Sciences, Jan. 1950, 36(1):48-49.

Ostrovski et al., "Payoff performance of fictitious play," CoRR, Aug. 19, 2013, arXiv:1308.4049, 16 pages.

Papadimitrion, "On the complexity of the parity argument and other inefficient proofs of existence," Journal of Computer and System Sciences, 48(3):498-532, 1994.

Paquette et al., "No-press Diplomacy: Modeling multi-agent gameplay," Advances in Neural Information Processing Systems, 2019, pp. 4476-4487.

Park et al., "Deadlock avoidance in sequential resource allocation systems with multiple resource acquisitions and flexible routings," IEEE Transactions on Automatic Control, Oct. 2001, 46(10):1572-1583.

Perolat et al. ,"From Poincaré recurrence to convergence in imperfect information games: Finding equilibrium via regularization," Proceedings of the 38th International Conference on Machine Learning, 2020, 139:8525-8535.

Portugal et al., "A survey on multi-robot patrolling algorithms," Doctoral Conference on Computing, Electrical and Industrial Systems, 2011, 349:139-146.

Resnick et al., "Pommerman: A multi-agent playground," CoRR, Sep. 19, 2019, arXiv:1809.07124, 6 pages.

Reveliotis et al., "Polynomial-complexity deadlock avoidance policies for sequential resource allocation systems," IEEE Transactions on Automatic Control, Oct. 1997, 42(10):1344-1357.

Roberson, "The Colonel Blotto game," Economic Theory, Jan. 18, 2006, 29(1):1-24.

Robinson, "An iterative method of solving a game," Annals of Mathematics, Sep. 1951, pp. 296-301.

Rooij et al., "Follow the leader if you can, hedge if you must," Journal of Machine Learning Research, 2014, 15(1):1281-1316.

Rosenbloom, "A world-championship-level Othello program," Artificial Intelligence, Nov. 1982, 19(3):279-320.

Ross et al., "A reduction of imitation learning and structured prediction to no-regret online learning," Proceedings of the Fourteenth International Conference on Artificial Intelligence and Statistics, 2011, 15:627-635.

Samnel, "Some studies in machine learning using the game of Checkers," IBM Journal of Research and Development, Jul. 1959, 3(3):210-229.

Schaeffer et al., "A world championship caliber Checkers program," Artificial Intelligence, Feb. 1992, 53(2-3):273-289.

Scherrer et al., "Approximate modified policy iteration and its application to the game of Tetris," Journal of Machine Learning Research, 2015, 16(49):1629-1676.

Schrandolph et al., "Temporal difference learning of position evahiation in the game of Go," Advances in Neural Information Processing Systems 6 (NIPS 1993), 1994, pp. 817-824.

Serrino et al., "Finding friend and foe in multi-agent games," Advances in Neural Information Processing Systems 32 (NeurIPS 2019), 2019, pp. 1249-1259.

Shapiro et al., "Learning a game strategy using pattern-weights and self-play," International Conference on Computers and Games, 2003, pp. 42-60.

Shapiro, "Note on a computation method in the theory of games," Communications on Pure and Applied Mathematics, Nov. 1958, XI:587-593.

Silver et al., "A general reinforcement learning algorithm that masters Chess, Shogi, and Go through self-play," Science, Dec. 7, 2018, 632(6419):1140-1144.

Silver et al., "Mastering the game of Go with deep neural networks and tree search," Nature, Jan. 28, 2016, 529(7587):484.

Silver et al., "Mastering the game of Go without human knowledge," Nature, Oct. 2017, 550(7676):354-359.

(56)          References Cited

OTHER PUBLICATIONS

Sites.google.com [online], "Diplomacy AI—Albert," Nov. 3, 2010, retrieved on Aug. 11, 2023, retrieved from URL<https://sites.google.com/site/diplomacyai>, 2 pages.

Smith, "Evolution and the Theory of Games," American Scientist, Jan. 1976, 1:41-45.

Song et al., "Arena: A general evaluation platform and building toolkit for multi-agent intelligence," Proceedings of the AAAI Conference on Artificial Intelligence, Apr. 3, 2020, 34(5):7253-7260.

Sutton et al., "Reinforcement Learning: An Introduction," MIT Press, Nov. 13, 2018, 10 pages.

Taylor et al., "Evolutionary stable strategies and game dynamics," Mathematical Biosciences, Jul. 1978, 40(1-2):145-156.

Tesauro, "TD-Gammon, a self-teaching Backgammon program, achieves master-level play," Neural Computation, Mar. 1, 1994, 6(2):215-219.

Vandael et al., "Reinforcement learning of heuristic EV fleet charging in a day-ahead electricity market," IEEE Transactions on Smart Grid, Jul. 4, 2015, 6(4):1795-1805.

Vinyals et al., "Grandmaster level in StarCraft II using multi-agent reinforcement learning," Nature, Nov. 2019, 575(7782):350-354.

Waller et al., "Confidence intervals for weighted proportions," Statistics in Medicine, May 30, 1994, 13(10):1071-1082.

Wang et al., "POET: open-ended coevolution of environments and their optimized solutions," Proceedings of the Genetic and Evolutionary Computation Conference, Jul. 2019, pp. 142-151.

Web.inter.nl.net [online], "Diplomacy Adjudicator Test Cases," Jan. 2002, retrieved on Apr. 21, 2023, retrieved from URL<http://web.inter.nl.net/users/L.B.Kruijswijk/>, 119 pages.

Webdiplomacy.net [online], "Diplomacy Adjudicator Test Cases," Sep. 2009, retrieved on Apr. 21, 2023, retrieved from URL=https://webdiplomacy.net/datc.php>, 37 pages.

Wilson, "Probable inference, the law of succession, and statistical inference," Journal of the American Statistical Association, May 8, 2012, 22(158):209-212.

* cited by examiner

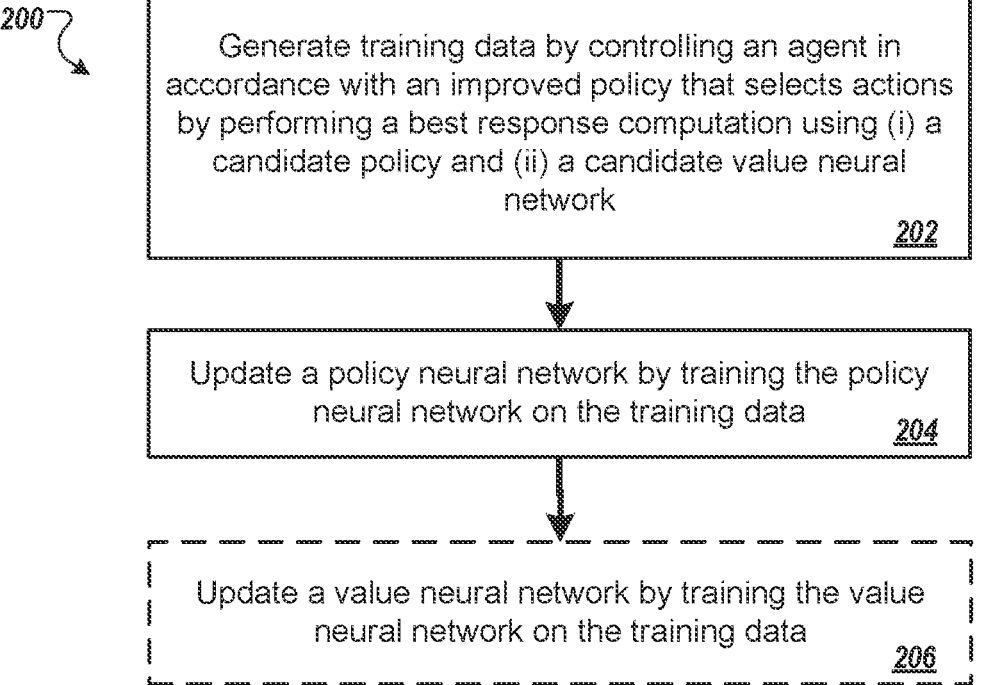

*200*

Generate training data by controlling an agent in accordance with an improved policy that selects actions by performing a best response computation using (i) a candidate policy and (ii) a candidate value neural network

*202*

Update a policy neural network by training the policy neural network on the training data

*204*

Update a value neural network by training the value neural network on the training data

TRAINING A POLICY NEURAL NETWORK FOR CONTROLLING AN AGENT USING BEST RESPONSE POLICY ITERATION

CROSS-REFERENCE TO RELATED APPLICATION

This application claims the benefit of the filing date of U.S. Application No. 63/149,032, filed on Feb. 12, 2021. The disclosure of the prior application is considered part of and is incorporated by reference in the disclosure of this application.

BACKGROUND

This specification relates to training a policy neural network that selects actions to be performed by a reinforcement learning agent.

Multiple reinforcement learning agents interact with an environment simultaneously by receiving an observation that characterizes the current state of the environment, and in response, performing respective actions. Once the actions are performed, each agent receives a reward that is dependent on the effect of the performance of the respective actions on the environment.

Some reinforcement learning systems use neural networks to select the actions to be performed by an agent in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning.

In general, one innovative aspect of the subject matter described in this specification can be embodied in methods that include the actions of training a policy neural network by repeatedly updating the policy neural network at each of a plurality of training iterations, the policy neural network having a plurality of policy network parameters and configured to receive as input a state representation characterizing a state of an environment and to process the state representation in accordance with the policy network parameters to generate a policy output that defines a probability distribution over a set of actions that can be performed by an agent interacting with the environment, including, for each of the plurality of training iterations: generating training data for the training iteration by controlling the agent in accordance with an improved policy that selects actions in response to input state representations by performing a best response computation using (i) a candidate policy generated from respective policy neural networks as of one or more preceding iterations and (ii) a candidate value neural network, wherein the candidate value neural network is configured to receive as input the state representation and to process the state representation to generate a value output that is an estimate of a value of the environment being in the state characterized by the state representation to complete a particular task; and updating the policy neural network by training the policy neural network on the training data. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. Training the policy neural network further includes repeatedly updating a value neural network at each of the plurality of training iterations, wherein the candidate value neural network is generated from respective value neural networks as of each of the one or more preceding iterations, and wherein the actions further include updating the value neural network by training the value neural network on the training data. The environment includes one or more other agents also interacting with the environment, and wherein performing the best response computation to select an action to be performed by the agent in response to a given input state representation includes: generating, using a base policy, a plurality of base profiles, each base profile including a respective action to be performed by each of the other agents in response to the given input state representation; processing the given input state representation using the candidate policy to generate a policy output; sampling a plurality of candidate actions from the probability distribution defined by the policy output; for each base profile and for each candidate action: determining a next state representation characterizing a predicted next state of the environment if the agent performs the candidate action and the other agents performed the actions in the base profile; and processing the next state representation using the candidate value neural network to generate a value estimate; determining, for each candidate action, an overall value estimate from the value estimates for the base profiles for the candidate action; and selecting, as the action to be performed by the agent in response to the given input state representation, the candidate action with the highest overall value estimate. The base policy includes respective base policy for each other agent, and the respective base policy for each other agent is generated from respective policy neural networks as of one or more preceding iterations. Determining the next state representation includes determining the next state representation by using a simulator of the environment that processes the candidate action performed by the agent and the actions in the base profile performed by the other agents to generate the next state representation. Updating the policy neural network by training the policy neural network on the training data includes: training the policy neural network using a supervised learning algorithm. The candidate policy is uniformly sampled among respective policy neural networks as of one or more preceding iterations.

The subject matter described in this specification can be implemented in particular embodiments so as to realize one or more of the following advantages.

Actions to be performed by an agent interacting with an environment that has a very large action space can be effectively selected by a trained policy neural network to maximize the value scores resulting from the performance of the actions and therefore cause the agent to effectively perform a desired task in the environment.

Additionally, the environment can include one or more other agents that simultaneously interact with the environment by taking their own actions. The actions to be performed by the agent can be selected to maximize the value scores resulting from both the performance of the actions by the agent and the performance of the respective actions by the one or more other agents, even though the actions performed by the agent and the one or more other agents feature a large combinatorial action space and simultaneous moves, e.g., the agent interactions can include complex mixtures of common-interest aspects and competitive aspects.

The policy neural network that selects the actions to be performed by the agent can be trained on training data that are generated with a simple yet effective sampled best response computation that is designed to handle the large combinatorial action space and simultaneous moves. Although the other agents may take actions in a large combinatorial action space, the sampled best response computation can generate an improved policy that produces the most favorable outcome for an agent, based on the other agents' policies.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for training a policy neural network for use in selecting actions to be performed by an agent interacting with an environment.

Like reference numbers and designations in the various drawings indicate like elements.

DETAILED DESCRIPTION

Figure 1:
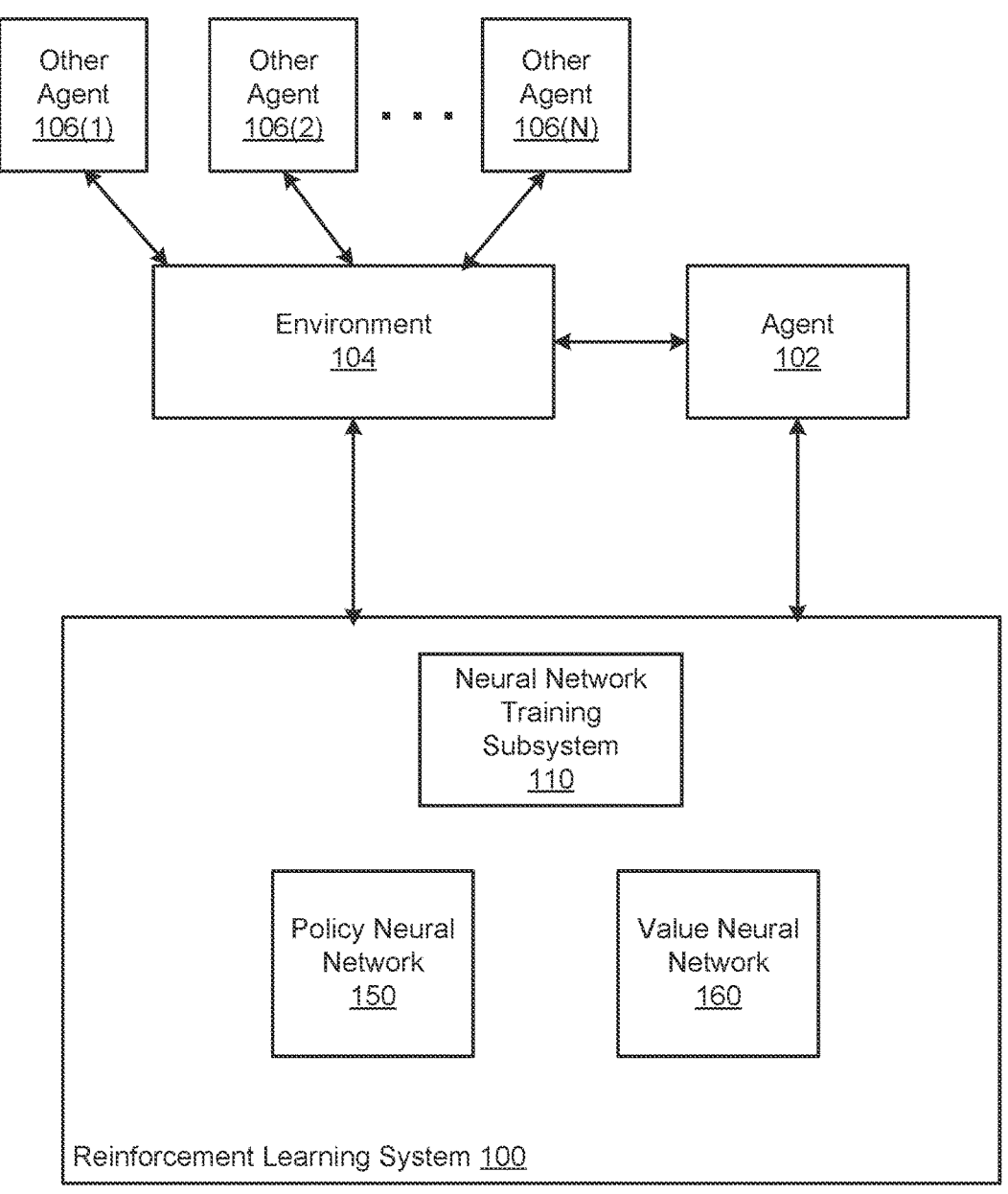
FIG. 1 shows an example reinforcement learning system.

This specification generally describes a reinforcement learning system that selects actions to be performed by a reinforcement learning agent interacting with an environment, while other agents simultaneously interact with the same environment.

In order to interact with the environment, the reinforcement learning system receives data characterizing the current state of the environment and selects actions to be performed by the agent in response to the received data.

Once an action has been selected by the reinforcement learning system, the agent performs the selected action to interact with the environment, while the other agents simultaneously perform their respective actions to interact with the environment.

Generally, the agent interacts with the environment in order to complete a particular task. That is, the reinforcement learning system selects actions in order to cause the agent to perform the actions that result in the agent completing the particular task.

The agent and the other agents can perform their respective actions over a plurality of turns. At each turn, instead of performing actions sequentially, the agent and the other agents can simultaneously perform their respective actions. Additionally, the interactions between the agent and the other agents can include a complex mixture of common-interest aspects and competitive aspects. Therefore, the combinatorial action space of the agent and the other agents can be very large.

For example, the environment can be a real-world environment that includes many mechanical agents interacting with the real-world environment, and the agent is a control system for one of the mechanical agents interacting with the real-world environment. For example, the environment can include a fleet of autonomous vehicles that simultaneously navigate through the environment. The agent may be a control system integrated in one of the autonomous vehicles in the fleet. The actions may be possible control inputs to control the autonomous vehicle and the task that the agent is attempting to complete are objectives for the navigation of the autonomous vehicle through the real-world environment. For example, the objectives can include one or more of: reaching a destination before the other vehicles, consuming less energy used in reaching the destination compared with the other vehicle, minimizing the time intervals between the vehicle and respective other vehicles in the group when they arrive at the destination, and so on. In order to complete the objectives, the autonomous vehicle can plan a route to avoid potential congestion caused by other vehicles, or the autonomous vehicle can plan a route that includes a detour with the goal of cutting in front another vehicle. As another example, a set of the vehicles can temporarily form a collaborative group to complete a particular task, e.g., preventing a particular vehicle from arriving at a dangerous location or to divide passengers or cargo across the set of vehicles and jointly transport the passengers or cargo to a common location.

The described technology can be used to manage a large number of vehicles in the water, on the land, or in the air, or a combination of these conditions. For example, the environment can include a fleet of drones or other unmanned aerial vehicles that simultaneously navigate through an environment. The agent may be a control system that controls a particular drone in the fleet of drones using a trained policy neural network. The other drones can be controlled by their own respective agent using their respective policies, or alternatively or in combination, can be controlled by human operators. The fleet of drones can navigate through the environment with various and dynamic relationships resulting in performing actions towards each of their goals. For example, the fleet of drones can navigate through the environment in a collaborative relationship, e.g., searching for a target person or a target building on the ground. As another example, the fleet of drones can navigate through the environment in a competitive relationship, e.g., competing for the first to arrive at a destination. The relationship between the particular drone and one or more other drones may change over time. In some implementations, the fleet of drones can carry one or more objects of interest. For example, the fleet of drones can transport cargo to a plurality of respective locations.

In some implementations, the environment can include a fleet of a large number of ships. Each ship can be controlled by an agent. The agents are responsible for large scale fleet management. The fleet of ships can navigate through the environment in a collaborative relationship or in an adversarial relationship. Each agent can control the actions of the corresponding ship based on the predicted actions of the other ships, such that the ship can get the highest rewards towards accomplishing its goal.

In some implementations, a particular agent can control a robot that patrols in an environment of adversaries. The adversaries can be controlled by other agents under their respective policies. For example, the adversaries can block the robot or attack the robot. The number of adversaries can be large. The environment can be complex, including building structures, trees, water, and other non-adversarial objects, etc. The particular agent can generate actions that can be performed by the robot to navigate through the adversaries based on policies of the adversaries. For example, the particular agent can control the robot to navigate through the environment without being encountered or attacked by some of the most dangerous adversaries.

In some other implementations, the environment is a simulated environment and the agent is implemented as one or more computer programs interacting with the simulated environment while one or more other agents simultaneously interact with the simulated environment. For example, the simulated environment may be a virtual environment in which one or more users compete against a computerized agent to accomplish a goal and the agent is the computerized agent. In this example, the actions in the set of actions are possible actions that can be performed by the computerized agent and the objective may be, e.g., to win the competition against the one or more users.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects an action to be performed by a reinforcement learning agent 102 interacting with an environment 104. That is, the reinforcement learning system 100 receives observations, with each observation being data characterizing a respective state of the environment 104, and, in response to each received observation, selects an action from a set of actions to be performed by the reinforcement learning agent 102 in response to the observation.

Once the reinforcement learning system 100 selects an action to be performed by the agent 102, the reinforcement learning system 100 instructs the agent 102 and the agent 102 performs the selected action. Generally, the agent 102 performing the selected action results in the environment 104 transitioning into a different state.

In some implementations, the environment 104 can include one or more other agents 106, e.g., 106(1), 106(2), . . . , 106(N), that also interact with the environment 104. Given a state of the environment 104, the agent 102 and the other agents 106 simultaneously perform respective actions in response to the given state of the environment 104. The combinatorial action space that represents the possible actions performed by the agent 102 and other agents 106 at any given time step can be very large.

The reinforcement learning system 100 selects an action to be performed by the agent 102 based on inputs that characterize the current state of the environment 104, and the actions previously performed by the other agents 106.

The other agents 106 can perform their respective actions in order to complete their respective tasks, which can be the same or different compared with the particular task of the agent 102. For example, the agent 102 and the other agents 106 can form a fleet of vehicles that share the same task of transporting goods from one location to the same destination, or different destinations. The other agents 106 can be controlled by one or more other computer systems, e.g., receiving and performing actions selected by one or more other reinforcement learning systems. Alternatively, or in combination, the other agents 106 can be controlled by human operators who choose the desired actions under a given state of the environment 104.

The observations characterize the state of the environment 104 in a manner that is appropriate for the context of use for the reinforcement learning system 100. For example, when the agent 102 is a control system for a mechanical agent interacting with the real-world environment, the observations may be images captured by sensors of the mechanical agent as it interacts with the real-world environment and, optionally, other sensor data captured by the sensors of the agent. For example, when the agent 102 is a control system that controls an autonomous vehicle, the observations may include map data that depicts the static objects in the environment, e.g., roads, trees, building, etc., and live road condition data that depicts non-static objects in the environment, e.g., pedestrians, other vehicles, color of the traffic lights, etc.

The actions performed by agent 102 or the other agents 106 can be in various forms. For example, the actions performed by a fleet of vehicles can include physical movements, e.g., moving forward, taking left or right turn, yielding, etc., and non-physical movements, e.g., send messages or signals to each other to show a certain intention of the agent, etc.

The actions performed by the agent 102 and the other agents 106 can indicate various forms of interactive relationships and strategies, e.g., collaborative or common-interest relationship, competitive relationship, or breaking up from a former collaborative relationship, etc. The reinforcement learning system 100 can generate the action to be performed by the agent 102 in response to a given state of the current environment and previous actions performed by one or more agents that can provide an indication of the interactive relationships between the agent and the other agents. For example, three other agents 106 of three autonomous vehicles can control the three vehicles to follow closely with each other, forming a collaborative small group. The agent 102 of an autonomous vehicle can generate actions in response to the state of the current environment and the previous actions performed by the agent 102 and the other agents 106 over the last turn, and the previous actions can indicate the historical collaborative relationship between the three other vehicles over the last turn, e.g., avoiding cutting in between the three vehicles, or selecting a detour route.

At each turn, the agent 102 may receive a reward based on the current state of the environment 104, the action of the agent 102, and the actions performed by the other agents 106. In general, a reward is a numerical value. The reward can be based on an event or an aspect of the environment. For example, the reward may indicate whether the agent 102 has accomplished a task (e.g., navigating to a target location in the environment 104) or the progress of the agent 102 towards accomplishing a task.

The interaction of the agent 102 with the environment 104 over one or more turns (e.g., time steps) can be represented by a "trajectory". A trajectory is a sequence of experience tuples, where each experience tuple corresponds to a respective turn. An experience tuple corresponding to a turn may include: (i) an observation characterizing the state of the environment at the current turn, and (ii) an action that was selected to be performed by the agent 102 at the current turn.

In some implementations, the observation in the experience tuple can further include one or more previous actions performed by the agent 102 and the other agents 106 at one or more previous turns. In some implementations, the experience tuple can further include one or more of the following: actions performed by the other agents 106 at the current turn, a subsequent observation characterizing a subsequent state of the environment subsequent to the agent 102 performing the selected action and the other agents 106 performing their respective actions, and a reward received subsequent to the agent 102 performing the selected action.

The reinforcement learning system 100 selects actions using a policy neural network 150, and a value neural network 160.

The policy neural network 150 is a neural network that is configured to receive an observation of the environment and to process the observation of the environment in accordance with parameters of the policy neural network to generate a respective action probability for each action in the set of possible actions that can be performed by the agent 102 to interact with the environment 104.

In some implementations, the policy neural network 150 is a convolutional neural network with a plurality of neural network parameters configured to process an observation of the environment. In some implementations, the observation of the environment can include (i) a state representation characterizing a state of an environment (e.g., images that depict the state of the environment), and (ii) previous actions performed by one or more other agents who also interact with the environment. The output layer of the policy neural network can generate a policy output that defines a probability distribution over a set of actions that can be performed by the agent interacting with the environment.

In some implementations, the policy neural network can include an encoder-decoder architecture. The encoder of the policy neural network can generate embedding representations of the input to the policy neural network, e.g., the state representation of the environment, previous actions performed by other agents 106, etc. For example, the encoder of the policy neural network can use an encoder that is based on a graph convolutional neural network (Thomas N Kipf and Max Welling. Semi-supervised classification with graph convolutional networks. arXiv preprint arXiv:1609.02907, 2016.).

The decoder of the policy neural network can sequentially decode the embedding representation of the input, and can generate the policy output that defines a probability distribution over a set of actions that can be performed by the agent. For example, the decoder of the policy neural network can use a recurrent neural network, e.g., a long short term memory (LSTM) neural network (Hochreiter, Sepp, and Jurgen Schmidhuber. Long short-term memory. Neural computation 9.8 (1997): 1735-1780). As another example, the decoder of the policy neural network can use one or more graph convolutional neural networks.

The value neural network 160 is configured to process an input that includes an observation of the environment to generate an output that includes a "state value" for the observation. The state value for an observation of the environment is an estimate of the cumulative reward that will be received from the environment if the agent 102 interacts with the environment by performing actions selected in accordance with the current values of the policy neural network parameters, and if the other agents 106 interacts with the environment by performing their respective actions selected in accordance with their respective policies. For example, the cumulative reward may be an estimate of a long-term time-discounted sum of future rewards that will be received from the environment if the agent interacts with the environment by performing actions selected in accordance with the current values of the policy neural network parameters, and if the other agents 106 interacts with the environment by performing their respective actions selected in accordance with their current policies.

The value neural network 160 can be implemented by any appropriate neural network architectures, for example, neural network architectures that include one or more of: convolutional layers, fully-connected layers, or recurrent layers. The value neural network 160 can have a neural network architecture that is similar to that of the policy neural network 150 but has a different type of output layer from that of the policy neural network 150, e.g., a regression output layer that results in the output of the value neural network 160 being a single value score. For example, the policy neural network 150 and the value neural network 160 can be implemented by a common neural network architecture, with a first output layer that generates a policy output that defines a probability distribution over a set of actions that can be performed by the agent 102, and a second output layer that generates state values.

To allow the agent 102 to effectively interact with the environment 104, the reinforcement learning system 100 includes a neural network training subsystem 110 that trains neural networks, e.g., the policy neural network 150 and the value neural network 160, to determine trained values of the parameters of the neural networks. Generally, the neural network training subsystem 110 trains the policy neural network 150 and the value neural network 160 in an iterative scheme over multiple iterations by iteratively updating the values of the parameters of the policy neural network 150 and the values of the parameters of the value neural network 160. At each training iteration, the subsystem 110 can determine parameter updates for the policy neural network and the parameter updates for the value neural network.

The subsystem 110 generates labeled training data iteratively during training using a "best response policy iteration" algorithm. At each training iteration, the subsystem 110 performs the following steps.

The subsystem first generates an improved policy that produces an improved outcome for the agent 102 based on the other agents' policies. The improved policy can be used to control the agent 102 by selecting one or more "improved" actions over one or more turns. The subsystem 110 generates the improved policy by applying a best response computation to a previous policy neural network and a previous value neural network. The best response computation can generate an improved policy that produces the most favorable outcome for an agent, based on the other agents' policies. More details regarding performing the best response computation is described below with reference to FIG. 3.

At the beginning of the iterative scheme, e.g., at the zero-th iteration, there may not be a previous policy neural network and a previous value neural network. The subsystem 110 can use an initial policy neural network and an initial value neural network trained using some labeled data that is available. For example, the subsystem can obtain a set of training data including actions performed by a human actor or some other policy. The system can use this set of training data to train the initial policy neural network and the initial value neural network under supervised learning.

The subsystem 110 uses the improved policy to select one or more actions to be performed by the agent 102 and generates trajectories of the agent 102 interacting with the environment 104 over one or more turns. The system also generates the corresponding state values of the next state of the environment in response to the selected actions using the values of the parameters of the current value neural network. In some implementations, the system can generate the trajectories using a simulator of the environment 104.

The subsystem 110 generates training data by sampling the generated trajectories. The subsystem 110 trains the policy neural network and the value neural network with the training data using a supervised learning method and updates the values of the parameters of the two neural networks.

The above-described iterative training process that iteratively uses an improved policy to generate training data is the "best response policy iteration" algorithm. Training the policy neural network 150 and the value neural network 160 using the "best response policy iteration" algorithm is described in more detail below with reference to FIG. 2.

For example, the environment 104 can be a real-world environment with an autonomous or semi-autonomous vehicle controlled by the agent 102 and multiple other vehicles controlled by the other agents 106. For a given input state of the environment 104 including a road map, and other vehicles' current positions and previous actions, the system can simulate the effects of various control inputs (e.g., moving forward, yielding, sending a message to another agent, etc.) on the navigation of the vehicle through the real-world environment. At each training iteration, the system can compute an improved policy to complete a particular task. The system can generate trajectories of the agent 102 performing actions selected by the improved policy over one or more turns. The system can sample the generated trajectories to generate labeled training data. Each training sample in the training data can include a selected action, a state value (cumulative reward) of the next state of the environment in response to the selected action, and the given input state of the environment. The system can use the labeled training data to train the policy neural network 150 and the value neural network 160.

Once the policy neural network 150 has been trained, the system 100 uses the trained policy neural network to select actions to be performed by the agent 102 in response to a given observation of the environment. For example, after the policy neural network 150 has been trained, the system 100 determines the trained values of the parameters of the policy neural network 150. The system receives as input to the policy neural network real actions performed by the other agents 106 and the current state of the environment 104 as input to the trained policy neural network 150. The trained policy neural network can generate a respective action probability for each action in the set of possible actions that can be performed by the agent 102 to interact with the environment 104.

The action probabilities can be used in any of a variety of ways to determine the action to be performed by the agent 102 at a turn. For example, the action to be performed by the agent 102 at the turn can be determined by sampling an action according to the probability values for the actions in the set of possible actions. As another example, the system can select the action with the highest action probability and the agent 102 can perform the action with the highest action probability.

FIG. 2 is a flow diagram of an example process 200 for training a policy neural network for use in selecting actions to be performed by an agent interacting with an environment. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200 to train a policy neural network 150.

The system trains a policy neural network by repeatedly updating the parameters of the policy neural network at each of a plurality of training iterations. For example, at each iteration, the system generates training data that includes actions chosen by an improved policy. The improved policy is generated using a previous policy and a previous value, and the improved policy is a policy that performs better than the previous policy. The system then trains the policy neural network 150 to predict the actions chosen by the improved policy.

In particular, at each iteration, the system can perform the steps of process 200.

The system generates training data for the iteration by controlling the agent in accordance with an improved policy that selects actions by performing a best response computation (step 202).

The improved policy produces the most favorable outcome for an agent, based on the other agents' policies. The improved policy can be generated by performing the best response computation using (i) a candidate policy and (ii) a candidate value neural network.

The candidate policy used in the best response computation can be generated from respective policy neural networks as of one or more preceding iterations. The candidate policy can be a policy neural network having parameter values equal to the parameter values of the policy neural network at a preceding iteration. For example, the candidate policy at iteration t can be a policy neural network having parameter values equal to the parameter values of the latest policy neural network at iteration t−1. The corresponding best response computation can approximate the best response based on the latest policy used by the system.

In some implementations, the candidate policy can be uniformly sampled among respective policy neural networks as of one or more preceding iterations. The corresponding best response computation can approximate a time-averaged version of the best responses over the one or more preceding iterations. For example, in order to generate the candidate policy at iteration t, the system can uniformly sample an iteration $d \in \{0, 1, \ldots, t-1\}$ instead of using the policy at the latest iteration t−1.

The best response computation can use the candidate value neural network to evaluate the next state of the environment as a result of the selected actions. The candidate value neural network can be configured to receive as input a state representation and to process the state representation to generate a value output. The value output can be an estimate of a value of the environment being in the state characterized by the state representation to complete a particular task.

For example, the environment can include an autonomous vehicle controlled by the agent 102 and one or more other vehicles controlled by one or more other agents 106 that simultaneously navigate through the environment. The candidate value neural network can be configured to estimate a reward from the environment if the agent 102 performs selected control inputs, e.g., moving forward, or making a turn, etc., with respect to a particular task for agent 102, e.g., minimizing the time intervals between the vehicle controlled by the agent 102 and respective other vehicles controlled by the other agents 106 in the group when they arrive at the destination. For example, if the vehicle moves closer to the other vehicles, the candidate value neural network can generate a high reward (e.g., 0.9), and if the vehicle moves further away from the other vehicles, the candidate value neural network can generate a low reward (e.g., 0.2).

After obtaining the improved policy, the system generates training data by sampling trajectories of actions performed by the agent 102, wherein the actions are selected using the improved policy. The training data generated with the improved policy can represent desired improvements for the policy neural network, and therefore the policy neural network can be updated and improved by training the policy neural network with the generated training data.

Generating the improved policy through the best response computation is described in more detail below with reference to FIG. 3.

The system updates the policy neural network for the iteration by training the policy neural network on the training data (step 204). The training data can be labeled training data that includes multiple input state representations and, for each input state representation, an action label that identifies an action that was selected with the improved policy by the best response computation in response to the input state representation.

For example, the action label may identify, for each input state representation of the environment, an action selected by the candidate policy that can generate a highest estimated reward computed by the candidate value neural network, when the environment was in the state characterized by the input state representation.

In some implementation, before training the policy neural network 150 in a plurality of iterations, the system can initialize the policy neural network 150 at iteration zero with a policy neural network that is trained with training data that includes actions performed by an expert, e.g., an agent being controlled by a human actor.

In some implementations, the system can train the policy neural network using a supervised learning algorithm. The system trains the policy neural network to generate action probabilities that match the action labels for the labeled training data by adjusting the values of the parameters of the policy neural network from initial values of the parameters to the trained values of the parameters. For example, the system can train the policy neural network using asynchronous stochastic gradient descent updates to maximize the log likelihood of the action identified by the action label for a given input state representation of the environment.

In some implementations, the system can update the value neural network for the iteration. The system can update the value neural network by training the value neural network on the training data (step 206). Each training sample in the training data is sampled from the trajectories generated with the improved policy. Each training sample includes an input state of the environment and a corresponding state value of the input state of the environment. The state value for a given state of the environment represents a time discounted sum of rewards to complete a particular task resulting from the environment being in the state. The system trains the value neural network by adjusting the values of the parameters of the value neural network.

For example, the system can calculate, using the candidate value neural network, the value of the next state of the environment resulting from a selected action performed by the agent 102 in the best response computation. The system can then associate the next state of the environment with the value of the next state of the environment to generate the training data.

The system can train the value neural network on the training data using supervised learning to determine trained values of the parameters of the value neural network from initial values of the parameters of the neural network. For example, the system can train the value neural network using asynchronous gradient descent to minimize the mean squared error between the value scores and the value labels in the training data.

In some implementations, the candidate value neural network that is used in the best response computation in step 202 can be generated from respective value neural networks as of each of the one or more preceding iterations. For example, the candidate value neural network at iteration t can use the latest value neural network at iteration t−1. The corresponding best response computation can approximate the best response based on the latest value neural network used by the system.

In some implementations, the candidate value neural network can be uniformly sampled among respective value neural networks as of one or more preceding iterations. The corresponding best response computation can approximate a time-averaged version of the best responses over the one or more preceding iterations. For example, at iteration t, the system can uniformly sample an iteration $d \in \{0, 1, \ldots, t−1\}$ instead of always using the latest iteration t−1. The system can use the value neural network at iteration d as the candidate value neural network and the system can use the corresponding policy neural network at iteration d as the candidate policy.

Figure 3:
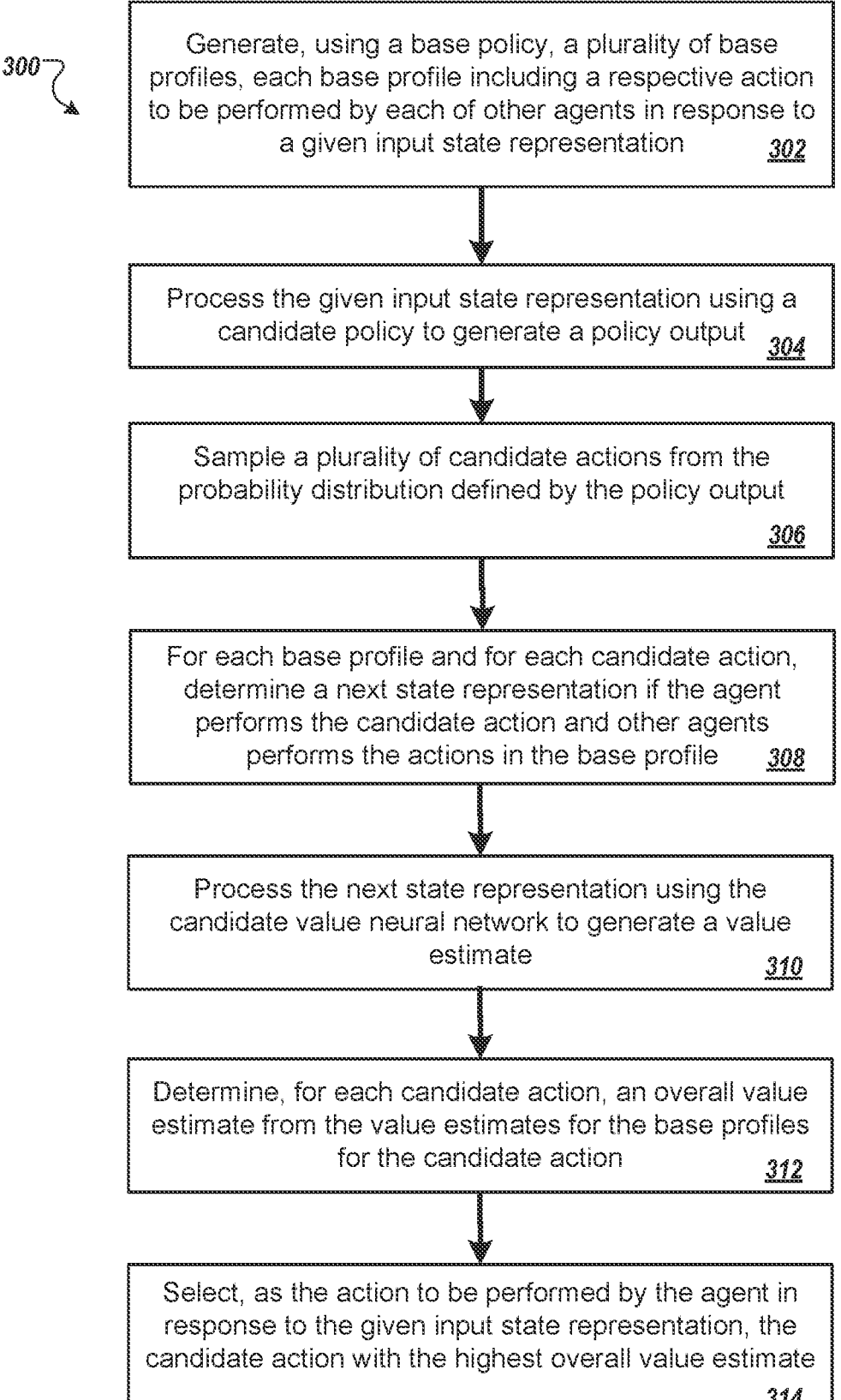
FIG. 3 is a flow diagram of an example process for performing the best response computation to select an action to be performed by the agent in response to a given input state representation of the environment.

FIG. 3 is a flow diagram of an example process 300 for performing the best response computation to select an action to be performed by the agent in response to a given input state representation of the environment. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The environment includes an agent 102 and one or more other agents 106 that simultaneously interact with the environment. An exact best response computation calculates over all possible combinations of actions performed by the agent and the other agents. As discussed previously, the combinatorial action space of the agent 102 and the other agents 106 can be very large. Therefore, in some implementations, the exact best response computation may not be efficient, or even possible in practice.

FIG. 3 describes a sampled best response computation that serves as an approximation to the exact best response computation. Additionally, rather than a full calculation predicting the state of the environment over multiple turns, e.g., evaluating whether a particular task can be successfully completed at the end, the system can simplify the computation and can make a single-turn improvement to the policy neural network.

The system generates, using a base policy, a plurality of base profiles (step 302).

The base policy can predict selected actions performed by each of the other agents in response to a given input state of the environment.

Each base profile produces a probability distribution of possible actions to be performed by each of the other agents in response to a given input state representation of the environment. In some implementations, because the number of action combinations available to the other agents is too large, the system can generate sampled base profiles, e.g., a smaller set of base profiles, which approximate the whole set of the base profiles of the other agents. For example, the system can use Monte-Carlo sampling to generate possible actions to be performed by each of the other agents. In some implementations, the Monte-Carlo sampling can generate the possible actions based on the probability distribution of possible actions generated by the base profile. When building the base profiles, the actions for each other agent can be randomly selected based on the policy of the other agent.

In some implementations, the base policy includes respective base policy for each other agent. The respective base policy for each other agent is generated from respective policy neural networks as of one or more preceding iterations. For example, the base policy for one of the other agents can either be the latest policy, or from a uniformly sampled previous policies. The system can generate respective base policy for each other agent at the same historical time, such that the correlations in the strategies of the other agents can be preserved.

In some implementations, the time points selected for generating the candidate policy and the candidate value network can be independent of the time points selected to produce the base profiles. For example, the system can use the latest policy and value neural networks for the candidate policy and the candidate value neural network, while uniformly sampling time points for the base profiles.

The system processes the given input state representation using the candidate policy to generate a policy output (step 304). The policy output defines a probability distribution over a set of actions that can be performed by the agent 102 in response to the given input state representation of the environment.

The system samples a plurality of candidate actions from the probability distribution defined by the policy output (step 306). Because the action space of the agent 102 can be too large, the system can take a small set of candidate actions, sampled from the probability distribution defined by the policy output generated from the candidate policy. The system later can select one of the candidate actions from the plurality of candidate actions as the action to be performed by the agent.

For each base profile and for each candidate action, the system determines a next state representation characterizing a predicted next state of the environment if the agent performs the candidate action and the other agents perform the actions in the base profile (step 308). In some implementations, the system determines the next state representation using a simulator of the environment that processes the candidate action performed by the agent and the actions in the base profile performed by the other agents to generate the next state representation. For example, the system can define a transition function that can take a current state of the environment, the candidate action performed by the agent, and the actions in the base profile performed by the other agents as input, and can generate a predicted next state of the environment using a simulated version of the environment.

For each base profile and for each candidate action, the system processes the next state representation using the candidate value neural network to generate a value estimate (step 310). The candidate value neural network is configured to receive as input the next state representation, and to process the next state representation to generate a value estimate that is an estimate of a time-discounted sum of rewards to complete a particular task based on the environment being in the next state.

For example, the environment can include an autonomous vehicle controlled by the agent 102 and one or more other vehicles controlled by one or more other agents 106 that simultaneously navigate through the environment. The particular task of the agent 102 can be minimizing the time intervals between the vehicle 102 and respective other vehicles 106 in the group when they arrive at a destination. A next state of the environment can be that the agent 102 is closer to a majority of the other agents. The next state can be beneficial to the final goal of minimizing the time intervals between the vehicle 102 and respective other vehicles 106 when they arrive at the destination. Therefore, the candidate value neural network can generate a higher value estimate for the next state of the environment that the agent 102 is closer to a majority of the other agents.

The system determines, for each candidate action, an overall value estimate from the value estimates for the base profiles (step 312). Each candidate action can be evaluated using the same set of base profiles that simulate various possible strategies of the other agents in response to the given input state of the environment. The same candidate action may result in a higher or lower value estimate for each one of the different base profiles. The system can calculate the overall value estimate as an estimate of the overall impact of the candidate action under various possible strategies taken by the other agents. For example, the overall value estimate can be an average value of the value estimates for the base profiles.

The system selects, as the action to be performed by the agent in response to the given input state representation, the candidate action with the highest overall value estimate (step 314). The candidate action with the highest overall value estimate can correspond to an approximate best response under a desirable improved policy. The candidate action with the highest overall value estimate can be associated with the given input state representation of the environment and can be added to the training data that can be used to train the policy neural network 150. In some implementations, the highest overall best response can be associated with the given input state representation of the environment and can be added to the training data that can be used to train the value neural network 160.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

training a policy neural network by repeatedly updating the policy neural network at each of a plurality of training iterations, the policy neural network having a plurality of policy network parameters and configured to receive as input a state representation characterizing a state of an environment and to process the state representation in accordance with the policy network parameters to generate a policy output that defines a probability distribution over a set of actions that can be performed by an agent interacting with the environment, the training comprising, for each of the plurality of training iterations:

generating training data for the training iteration by controlling the agent in accordance with an improved policy that selects actions in response to input state representations by performing a best response computation, comprising:

determining a plurality of candidate actions using a candidate policy generated from respective policy neural networks as of one or more preceding iterations;

determining a value estimate for each candidate action using a candidate value neural network, wherein the candidate value neural network is configured to receive as input a state representation and the candidate action, and to process the state representation and the candidate action to generate a value output that is an estimate of a value of the environment being in the state characterized by the state representation and the agent performing the candidate action to complete a particular task; and selecting, as the action to be performed by the agent in response to the state representation, the candidate action with a highest value estimate; and updating the policy neural network by training the policy neural network on the training data.

2. The method of claim 1, wherein training the policy neural network further comprises repeatedly updating a value neural network at each of the plurality of training iterations, wherein the candidate value neural network is generated from respective value neural networks as of each of the one or more preceding iterations, and wherein the method further comprises:

updating the value neural network by training the value neural network on the training data.

3. The method of claim 1, wherein the environment comprises one or more other agents also interacting with the environment, and wherein performing the best response computation to select the action to be performed by the agent in response to the state representation comprises:

generating, using a base policy, a plurality of base profiles, each base profile comprising a respective action to be performed by each of the other agents in response to the state representation;

determining the plurality of candidate actions using the candidate policy, comprising:

processing the state representation using the candidate policy to generate a policy output; and sampling the plurality of candidate actions from the probability distribution defined by the policy output;

determining the value estimate for each candidate action using the candidate value neural network, comprising:

for each base profile and for each candidate action:

determining a next state representation characterizing a predicted next state of the environment if the agent performs the candidate action and the other agents performed the actions in the base profile; and processing the next state representation using the candidate value neural network to generate a value estimate for the base profile for the candidate action; and determining the value estimate for each candidate action, wherein the value estimate for each candidate action comprises an overall value estimate from the value estimates for the base profiles for the candidate action; and selecting, as the action to be performed by the agent in response to the state representation, the candidate action with the highest value estimate, comprising:

selecting, as the action to be performed by the agent in response to the state representation, the candidate action with a highest overall value estimate.

4. The method of claim 3, wherein the base policy comprises a respective base policy for each other agent, and the respective base policy for each other agent is generated from respective policy neural networks as of one or more preceding iterations.

5. The method of claim 3, wherein determining the next state representation comprises determining the next state representation by using a simulator of the environment that processes the candidate action performed by the agent and the actions in the base profile performed by the other agents to generate the next state representation.

6. The method of claim 1, wherein updating the policy neural network by training the policy neural network on the training data comprises:

training the policy neural network using a supervised learning algorithm.

7. The method of claim 1, wherein the candidate policy is uniformly sampled among respective policy neural networks as of one or more preceding iterations.

8. A system comprising one or more computers and one or more storage devices storing instructions that when executed by the one or more computers cause the one or more computers to perform operations comprising:

training a policy neural network by repeatedly updating the policy neural network at each of a plurality of training iterations, the policy neural network having a plurality of policy network parameters and configured to receive as input a state representation characterizing a state of an environment and to process the state representation in accordance with the policy network parameters to generate a policy output that defines a probability distribution over a set of actions that can be performed by an agent interacting with the environment, comprising, for each of the plurality of training iterations:

generating training data for the training iteration by controlling the agent in accordance with an improved policy that selects actions in response to input state representations by performing a best response computation, comprising:

determining a plurality of candidate actions using a candidate policy generated from respective policy neural networks as of one or more preceding iterations;

determining a value estimate for each candidate action using a candidate value neural network, wherein the candidate value neural network is configured to receive as input a state representation and the candidate action, and to process the state representation and the candidate action to generate a value output that is an estimate of a value of the environment being in the state characterized by the state representation and the agent performing the candidate action to complete a particular task; and selecting, as the action to be performed by the agent in response to the state representation, the candidate action with a highest value estimate; and updating the policy neural network by training the policy neural network on the training data.

9. The system of claim 8, wherein training the policy neural network further comprises repeatedly updating a value neural network at each of the plurality of training iterations, wherein the candidate value neural network is generated from respective value neural networks as of each of the one or more preceding iterations, and wherein the operations further comprise:

updating the value neural network by training the value neural network on the training data.

10. The system of claim 8, wherein the environment comprises one or more other agents also interacting with the environment, and wherein performing the best response computation to select the action to be performed by the agent in response to the state representation comprises:

generating, using a base policy, a plurality of base profiles, each base profile comprising a respective action to be performed by each of the other agents in response to the state representation;

determining the plurality of candidate actions using the candidate policy, comprising:

processing the state representation using the candidate policy to generate a policy output; and sampling the plurality of candidate actions from the probability distribution defined by the policy output;

determining the value estimate for each candidate action using the candidate value neural network, comprising:

for each base profile and for each candidate action:

determining a next state representation characterizing a predicted next state of the environment if the agent performs the candidate action and the other agents performed the actions in the base profile; and processing the next state representation using the candidate value neural network to generate a value estimate for the base profile for the candidate action; and determining the value estimate for each candidate action, wherein the value estimate for each candidate action comprises an overall value estimate from the value estimates for the base profiles for the candidate action; and selecting, as the action to be performed by the agent in response to the state representation, the candidate action with the highest value estimate, comprising: selecting, as the action to be performed by the agent in response to the state representation, the candidate action with a highest overall value estimate.

11. The system of claim 10, wherein the base policy comprises a respective base policy for each other agent, and the respective base policy for each other agent is generated from respective policy neural networks as of one or more preceding iterations.

12. The system of claim 10, wherein determining the next state representation comprises determining the next state representation by using a simulator of the environment that processes the candidate action performed by the agent and the actions in the base profile performed by the other agents to generate the next state representation.

13. The system of claim 8, wherein updating the policy neural network by training the policy neural network on the training data comprises:

training the policy neural network using a supervised learning algorithm.

14. The system of claim 8, wherein the candidate policy is uniformly sampled among respective policy neural networks as of one or more preceding iterations.

15. One or more non-transitory computer-readable storage media storing instructions that when executed by one or more computers cause the one or more computers to perform operations comprising:

training a policy neural network by repeatedly updating the policy neural network at each of a plurality of training iterations, the policy neural network having a plurality of policy network parameters and configured to receive as input a state representation characterizing a state of an environment and to process the state representation in accordance with the policy network parameters to generate a policy output that defines a probability distribution over a set of actions that can be performed by an agent interacting with the environment, comprising, for each of the plurality of training iterations:

generating training data for the training iteration by controlling the agent in accordance with an improved policy that selects actions in response to input state representations by performing a best response computation, comprising:

determining a plurality of candidate actions using a candidate policy generated from respective policy neural networks as of one or more preceding iterations;

determining a value estimate for each candidate action using a candidate value neural network, wherein the candidate value neural network is configured to receive as input a state representation and the candidate action, and to process the state representation and the candidate action to generate a value output that is an estimate of a value of the environment being in the state characterized by the state representation and the agent performing the candidate action to complete a particular task; and selecting, as the action to be performed by the agent in response to the state representation, the candidate action with a highest value estimate; and updating the policy neural network by training the policy neural network on the training data.

16. The computer-readable storage media of claim 15, wherein training the policy neural network further comprises repeatedly updating a value neural network at each of the plurality of training iterations, wherein the candidate value neural network is generated from respective value neural networks as of each of the one or more preceding iterations, and wherein the operations further comprise:

updating the value neural network by training the value neural network on the training data.

17. The computer-readable storage media of claim 15, wherein the environment comprises one or more other agents also interacting with the environment, and wherein performing the best response computation to select the action to be performed by the agent in response to the state representation comprises:

generating, using a base policy, a plurality of base profiles, each base profile comprising a respective action to be performed by each of the other agents in response to the state representation;

determining the plurality of candidate actions using the candidate policy, comprising:

processing the state representation using the candidate policy to generate a policy output; and sampling the plurality of candidate actions from the probability distribution defined by the policy output;

determining the value estimate for each candidate action using the candidate value neural network, comprising:

for each base profile and for each candidate action:

determining a next state representation characterizing a predicted next state of the environment if the agent performs the candidate action and the other agents performed the actions in the base profile; and processing the next state representation using the candidate value neural network to generate a value estimate for the base profile for the candidate action; and determining the value estimate for each candidate action, wherein the value estimate for each candidate action comprises an overall value estimate from the value estimates for the base profiles for the candidate action; and selecting, as the action to be performed by the agent in response to the state representation, the candidate action with the highest value estimate, comprising:

selecting, as the action to be performed by the agent in response to the state representation, the candidate action with a highest overall value estimate.

18. The computer-readable storage media of claim 17, wherein the base policy comprises a respective base policy for each other agent, and the respective base policy for each other agent is generated from respective policy neural networks as of one or more preceding iterations.

19. The computer-readable storage media of claim 17, wherein determining the next state representation comprises determining the next state representation by using a simulator of the environment that processes the candidate action performed by the agent and the actions in the base profile performed by the other agents to generate the next state representation.

20. The computer-readable storage media of claim 15, wherein updating the policy neural network by training the policy neural network on the training data comprises:

training the policy neural network using a supervised learning algorithm.

* * * * *